United States Patent [19]

Frauendorf et al.

[11] Patent Number: 5,032,664
[45] Date of Patent: Jul. 16, 1991

[54] PROCESS FOR THE PRODUCTION OF SEGMENTED POLYURETHANE UREA ELASTOMER SOLUTIONS AND FILAMENTS AND FILMS THEREOF

[75] Inventors: Beatrix Frauendorf, Leverkusen; Michael Kausch, Cologne; Rolf-Volker Meyer, Krefeld-Bockum, all of Fed. Rep. of Germany

[73] Assignee: Bayer Aktiengesellschaft, Leverkusen-Bayerwerk, Fed. Rep. of Germany

[21] Appl. No.: 586,246

[22] Filed: Sep. 21, 1990

[30] Foreign Application Priority Data

Oct. 3, 1989 [DE] Fed. Rep. of Germany ....... 3932948

[51] Int. Cl.$^5$ ............................................. C08G 18/30
[52] U.S. Cl. ........................................ 528/49; 528/80; 521/155; 525/434; 525/457
[58] Field of Search ..................... 528/49, 80; 521/155; 525/434, 457

[56] References Cited

U.S. PATENT DOCUMENTS 4,071,505 1/1978 Meckel et al. ...................... 528/4 G
4,098,772 7/1978 Bonk et al. .......................... 528/4 G
4,195,132 3/1980 Sundermann et al. ............. 528/4 G
4,393,186 7/1983 Damico et al. ..................... 528/4 G Primary Examiner—John Kight, III.
Assistant Examiner—D. Devon
Attorney, Agent, or Firm—Connolly and Hutz

[57] ABSTRACT

The invention relates to a process for the production of highly concentrated and, surprisingly, viscosity-stable solutions of segmented polyurethane urea elastomers in highly polar solvents, such as dimethyl formamide and dimethyl acetamide, having little or no tendency to turn to paste, characterized by the use of certain primary and secondary cycloaliphatic monoamines or cycloaliphatic monoisocyanates as chain-extending agents/blocking agents in the reaction of NCO prepolymers based on relatively high molecular weight dihydroxy compounds and (preferably aromatic) diisocyanates with aliphatic and and/or cycloaliphatic diamine chain-extending agents. The chain terminators according to the invention also show unexpected iprovements in the color of the elastomer solution and also in the stability of the end products, preferably filaments, to light and noxious gases.

The invention also relates to elastomers of corresponding composition containing special terminators, preferably in the form of filaments, films or coatings showing improved stability to light and waste gases.

5 Claims, No Drawings

PROCESS FOR THE PRODUCTION OF SEGMENTED POLYURETHANE UREA ELASTOMER SOLUTIONS AND FILAMENTS AND FILMS THEREOF

This invention relates to a process for the production of highly concentrated solutions of segmented polyurethane urea elastomers in highly polar solvents, such as dimethyl formamide and dimethyl acetamide, which show surprisingly high solution viscosity and/or a considerably reduced tendency to turn pasty, characterized by the use of certain primary and secondary cycloaliphatic monoamines or cycloaliphatic monoisocyanates as chain-extending agents/blocking agents in the reaction of NCO prepolymers based on relatively high molecular weight dihydroxy compounds and (preferably aromatic) diisocyanates with aliphatic and/or cycloaliphatic diamine chain-extending agents. The chain terminators according to the invention also show unexpected improvements in the natural color of the elastomer solution and also in the stability of the end products, preferably filaments, to light and noxious gases.

The present invention also relates to elastomers of corresponding composition containing special terminators, preferably in the form of filaments, films or coatings characterized by improved stability to light and waste gases.

Elastane fibers are filaments of which at least 85% by weight consist of segmented polyrrethane (urea)s. Elastane fibers are typically produced by initially terminating a long-chain diol (macrodiol) with a diisocyanates so that a macrodiisocyanate (NCO prepolymer) is obtained. In a second step, the NCO prepolymer is reacted with a chain-extending agent typically consisting of a diamine to form a high molecular weight polyurethane urea. The macrodiisocyanates synthesized in the prepolymer stage are typically reacted in solution with diamines. The final solids concentration is generally 20 to 30% by weight.

These polyurethane ureas are synthesized in such a way that the macromolecule has a segment structure, i.e. consists of crystalline and amorphous blocks (hard segments and soft segments). By virtue of their crystallinity, the hard segments then act as fixing points for the network and, accordingly, determine the strength of the moldings produced from the polymers. By contrast, the soft segments, of which the glass transition temperature must be below the service temperature, determine the elasticity of the elastomers.

PRIOR ART

To improve economy (high-speed spinning) and also from the ecological viewpoint (reducing the solvent content of the elastane spinning solution), elastane spinning solutions should have solids concentrations of >30%. However, solids concentrations as high as these present problems in regard to limited solubility, particularly in the event of prolonged storage of the spinning solutions, which is reflected in paste formation and/or an increase in viscosity. A frequent result of the increasing viscosity is that the elastane solution can no longer be further processed/spun. These phenomena can have different causes.

In the case of highly concentrated elastane solutions, the following factors for example can result in a deterioration in solubility:

(1) The lower the solvent content, the more quickly the soft segments consisting of high molecular weight polyester and/or polyether diols (macrodiols), preferred molecular weight 2,000, undergo desolvation.

In addition, polyether diols show poorer solubility in typical solvents than polyester diols. Desolvation is intensified particularly where polyether/polyester diol mixtures are used because, from the outset, such mixtures have a tendency to separate through microphase separation on account of their different solubility.

(2) For special applications where particularly high strengths and thermal stability are required, a higher diisocyanate content than usual is used (NCO content, based on solids, $\geq 2.5\%$ by weight). The high percentage of polyurea segments thus produced in the elastane leads to a reduction in the solubility of the elastane solution and an increase in its tendency to turn pasty.

(3) Since any increase in temperature is known to lead to a reduction in solution viscosity, highly concentrated elastane solutions are frequently stored at elevated temperature, for example 50° C. In many cases, however, this results after only one to two days in a drastic increase in the viscosity of the elastane solution which is frequently based on an increase in molecular weight. It is assumed that the process involved is, essentially, terminal group aminolysis in which the secondary monoamines are displaced from the urea bonds by the terminal primary amino groups (from the diamine chain-extending agents, such as ethylenediamine).

(4) Although prolonged heating of elastane solutions or pastes, for example for 2 to 5 hours at 80° to 120° C., leads to a reduction in molecular weight, as reflected in a reduction in the $\eta_{rel}$ value of the polymer with increasing intensity of exposure, it is difficult to control, wasteful of energy and, in many cases, does not lead to spinnable elastane solutions.

If the polyaddition reaction (chain extension) is carried out in the polar organic solvents typically used, more particularly with ethylenediamine, solubility decreases with increasing molecular weight, so that the solution can be expected to turn to paste. For this reason, the polyaddition reaction is often continued to a predetermined viscosity at which a monofunctional chain terminator, such as dibutyl amine, octyl amine, butanone oxime (Houben-Weyl, Vol. E 20/Part 2, page 1642), but preferably diethyl amine (Ullmann's Encyclopedia of Industrial Chemistry, Vol. A 10, page 612), is added. In this way, a narrow molecular weight distribution is obtained at the same time.

Thus, DE-OS 2 323 393 describes the production of polyurethanes having uniform and reproducible rheological properties and a constant molecular weight. Sterically hindered secondary alcohols corresponding to the formula

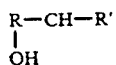

are used as chain terminators for this purpose.

If, however, these OH-functional chain terminators are used in the production of polyurethane ureas, problems arise in the form of poorer reactivity compared to the ethylenediamine normally used as chain-extending agent. As a result of the fact that chain extension takes place preferentially to chain termination on account of the higher reactivity of the ethylenediamine, there is an uncontrolled increase in viscosity with an increased tendency towards paste formation. This effect is even greater in the case of highly concentrated solutions.

Since termination of the polyaddition reaction with monofunctional alcohols takes place very slowly, attempts have been made to produce polyurethane solutions of stable viscosity by the use of monofunctional, low molecular weight oximes, preferably butanone oxime (DE-OS 3 142 706). It is also stated therein that, after termination of the polyaddition reaction with oxime, the reaction may optionally be continued at elevated temperature.

However, since highly concentrated elastane solutions often have to be stored at relatively high temperatures to reduce their viscosity, the use of oximes is not practicable. Thus, the oxime chain terminator can be released again by increasing the storage temperature to 50° C., resulting in an uncontrolled, marked increase in viscosity of the elastane solution in addition to the release of hydroxylamine which is undesirable on ecological grounds.

According to DE-OS 2 500 921, polyurethanes of controlled viscosity are obtained by adding an excess of a monoamine, based on NCO groups still present, to a reaction mixture of polyhydroxyl compounds and polyisocyanates when the desired final viscosity is reached and then binding the remaining monoamine with a monoisocyanate.

DE-OS 2 418 075 describes the production of thermoplastic polyurethane elastomers with chain terminators having the general structural formulae R—OH, R'—NH$_2$ or R'—NH—R" where R, R' and R" represent a linear or branched carbon chain containing 1 to 30 carbon atoms.

Although the aminofunctional chain terminators mentioned above are comparable in their reactivity with the chain-extending agent ethylenediamine, they do not bring about the desired improvement in solubility when used in highly concentrated polyurethane urea solutions.

It is also known that a few mol percent of a co-chain extending agent, for example 1,2-diaminopropane, 1,3-diaminocyclohexane, piperazine or even water, can be used in addition to the chain-extending agent, generally ethylenediamine, to obtain better elastomer solubility through disturbances in the synthesis of the hard segment (Houben-Weyl, Vol. E 20/Part 2, page 1643). However, this results in more or less distinct losses in the thermal and elastic properties of the elastane filaments produced therefrom.

Attempts have also been made to obtain an improvement in solubility by reducing the number of hard segments (lower diisocyanate content). However, this improvement is again obtained at the expense of lower strengths and poorer thermal stability.

Accordingly, the problem addressed by the present invention was to provide a cost-reducing and also more environment-friendly (low-solvent and improvement in economy by high-speed spinning) process for the production of highly concentrated elastane solutions having improved rheological flow properties (improvement in spinnability through lower solution viscosity with the necessary molecular weights intact) and improved viscosity stability in the event of prolonged storage of elastane solutions with no deterioration in the thermal or elastic behavior of the end products obtained therefrom. As will be seen in detail from the description and the Examples, these advantages were achieved by the production process according to the invention and by segmented polyurethane urea elastane solutions of corresponding composition.

It has now surprisingly been found that homogeneous, highly concentrated spinning solutions of high viscosity stability both of polyester or polyether diols and, in particular, of mixtures of polyester and polyether diols having excellent flow properties and, hence, better spinnability can be produced by simple processes providing sterically demanding chain terminators corresponding to formulae specified below (monoamines) and/or optionally monoisocyanates derived from the primary amines of the chain terminators by capping of the amino groups by the NCO group are used as monofunctional chain terminators. Equally surprising was the fact that with the chain terminators used in accordance with the invention it was possible to produce spinning solutions having an improved natural color which, in turn, give elastane filaments having improved stability to light and noxious gases, coupled with good thermal and elastic properties.

Accordingly, the present invention relates to a process for the production of highly concentrated elastane solutions having improved rheological flow properties and high viscosity stability in the event of prolonged storage, coupled with the usual thermal and elastic properties, from correspondingly prepared segmented polyurethane ureas using certain monoamines and/or monoisocyanates as chain terminators.

It is readily possible by the process according to the invention to produce highly concentrated elastane solutions based on polyurethane ureas having a solids content of up to 40% by weight which combine excellent solubility with viscosity stability, even for a relatively large number of hard segments, i.e. a relatively high diisocyanate content, and surprisingly with an improvement in the natural color of the elastane solution. Accordingly, it is surprisingly possible positively to influence both the natural color and solubility of the elastane solution and also the stability of filaments spun therefrom to light and noxious gases through the special structure of the chain terminators used in accordance with the invention, letter properties being obtained with the chain terminators/blocking agents according to the invention than with comparable compositions with no chain terminator or with known chain terminators, for example diethyl amine or dibutyl amine.

Accordingly, the present invention relates to a process for the production of solutions of segmented polyurethane ureas in solvents by reaction of NCO prepolymers based on relatively high molecular weight dihydroxy compounds and excess quantities of diisocyanates with chain-extending agents terminated by NH-functional groups in the presence of monofunctional primary and/or secondary amines as chain terminators, characterized in that primary and/or secondary cycloaliphatic monoamines or secondary, cyclic, heterocyclic monoamines are used as chain terminates or blocking agents in quantities of 0.01 to 10 equivalent-%, based on equivalents present in the NCO prepolymer, and preferably in quantities of 0.5 to 7 equivalent-%.

In a preferred embodiment, the invention relates to a process of the described type which is characterized in that primary and/or secondary cyclic monoamines corresponding to general formula A1 to A6

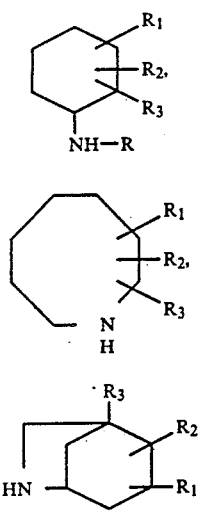

(A1)

(A2)

(A3)

(cycloaliphatic amines or heterocyclic monoamines)

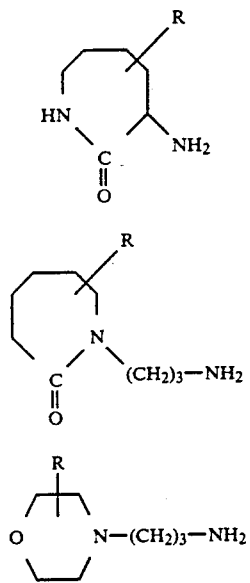

(A4)

(A5)

(A6)

in which
R=H, a linear or branched $C_{1-4}$ alkyl radical or a cycloalkyl radical (preferably H, $CH_3$, cyclohexyl)
$R_1$, $R_2$, $R_3$=H or a linear or branched $C_{1-4}$ alkyl radical, but at least an alkyl radical unless R is already alkyl or cycloalkyl,
at least one of the substituents $R_1$, $R_2$ and $R_3$ being alkyl radical where R=H, are used as the chain-terminators/blocking agents g).

More particularly, the invention relates to a process of the described type which is characterized in that, in a first step, an NCO prepolymer of
a) a relatively high molecular weight dihydroxy compound having molecular weights of 1,000 to 8,000 and preferably 1,500 to 4,000, for example polyester diols or polyether diols or mixtures of polyester and polyether diols or copolyether esters, is reacted
b) optionally with addition of low molecular weight dihydroxy compounds having molecular weights of 62 to 399 (for example N,N-bis-(β-hydroxypropyl-N-methyl amine) in quantities of up to at most 15 mol-%, based on a), and
c) excess molar quantities of aromatic and/or, (cyclo)aliphatic diisocyanates (except 1,4-cyclohexane diisocyanate) or mixtures of diisocyanates,
d) optionally in the presence of catalysts, more particularly tin catalysts (0.002 to 0.5% by weight),
e) in the melt or in solvents, preferably highly polar amide solvents, such as dimethyl formamide or, more particularly, dimethyl acetamide, to form an NCO prepolymer having an NCO content (based on solids) of 1.4 to 4.5% by weight and preferably 1.8 to 4.0% by weight and in a second step, the NCO prepolymer thus formed is chain-extended with
f) solutions of (cyclo)aliphatic diamines, more particularly alkylenediamines, such as ethylenediamine, in highly polar amide solvents, the chain-extending reaction being carried out in the presence of
g) the special monofunctional chain terminators/blocking agents based on monoamines corresponding to the following general formulae

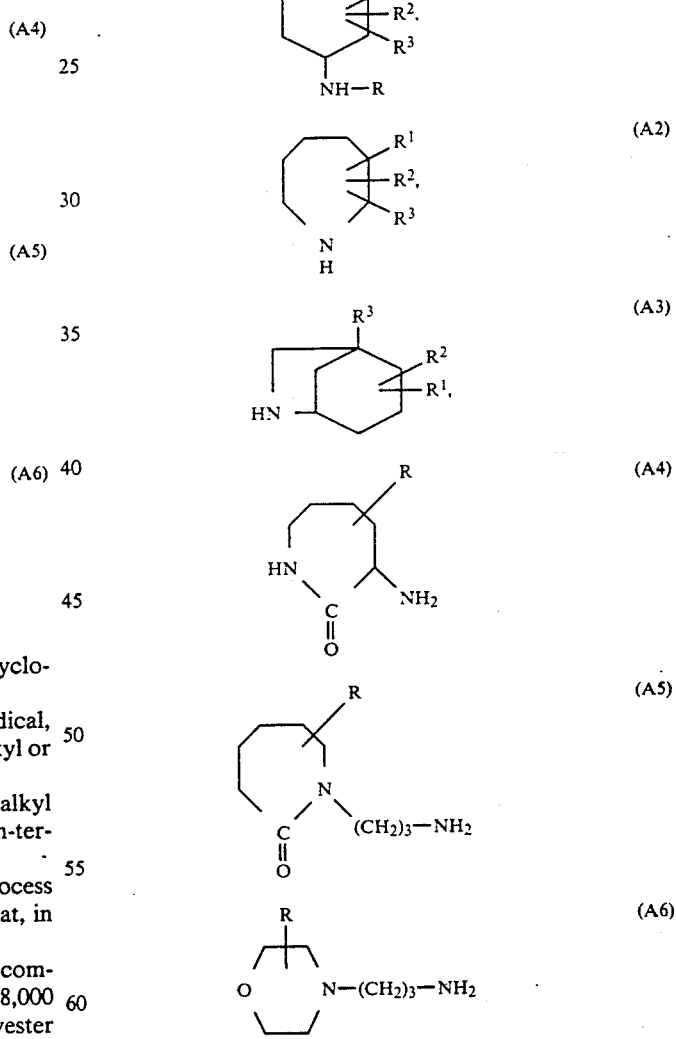

in which the substituents are as defined above, in quantities of 0.01 to 10 equivalent-% and preferably in quantities of 0.5 to 7 equivalent-% and more preferably in quantities of 1.0 to 5 equivalent-%, based on NCO equivalents present in the NCO prepolymer (the NCO equivalents correspond to the theoretical amine equivalents of the chain extending agents). and reacted to form elastomer solutions having a solids concentration of at least 15% by weight and preferably 20 to 40% by weight.

Examples for (A5) and (A6) are N-(Ω-aminoalkyl) caprolactams and N-(Ω-aminoalkyl) morpholines, more preferably N-(3-aminopropyl)-morpholine and N-(3-aminopropyl caprolactam.

Preferably are at least two of the substituents R, $R_1$-$R_3$ a (cyclo)alkyl group.

In a particularly preferred embodiment of the process according to the invention, 3,3,5-trimethyl-1-azacycloheptane (TMD imine), 1-amino-3,3,5-trimethyl cyclohexane, 1-amino-3-methyl cyclohexane, 1-amino-2-methyl cyclohexyl amine, α-aminocaprolactam or a compound

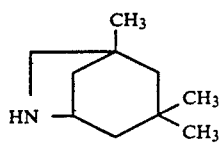

or the corresponding monoisocyanates of the primary amines mentioned are used as chain-extending agents/blocking agents.

The elastomer solutions may be spun to filaments by standard methods, more particularly by dry or wet spinning, or dried or coagulated to form films, optionally after the addition of typical additives (i).

According, the present invention also relates to filaments, films or coatings, preferably filaments, of segmented polyurethane ureas produced by the described process containing terminal groups corresponding to the following formulae

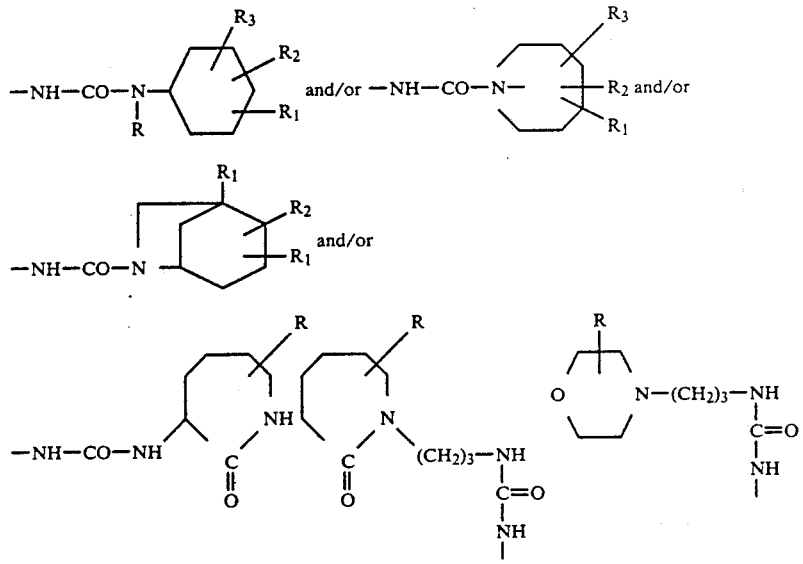

in which
R = hydrogen, a $C_{1-4}$ alkyl group or a cyclohexyl group,
$R_1$, $R_2$ and $R_3$ = hydrogen or a linear or branched $C_{1-4}$ alkyl group, but contain at least one alkyl group where R is hydrogen.

The segmented polyurethane urea elastomers produced in accordance with the invention give clear spinning solutions of adequate stability which may readily by wet-spun and, in particular, dry-spun by standard methods, even with high solids concentrations (for example 30 to 40% by weight). The preferably highly concentrated spinning solutions produced in accordance with the invention show excellent viscosity stability both at 25° C. and at 50° C. during storage, for example even at high concentrations) for up to at least 5 days and longer. The spinning solutions prepared in accordance with the invention surprisingly show a distinct improvement in natural color, in some cases even without additions of light stabilizers. Surprisingly, the elastomer filaments obtained from the spinning solutions prepared in accordance with the invention also show considerably improved stability to light and noxious gases.

Through the use of the special chain terminators/blocking agents, the production process according to the invention enables improved elastomer filaments to be obtained by making use of such advantages as the improvement in solubility, viscosity stability even in the event of prolonged storage at elevated temperature, the improvement in natural color, the improvement in stability to light and noxious gases, without any deterioration in the sole and mechanical properties of the filaments.

The chain-extending agents/blocking agents according to the invention unexpectedly provide for improved properties in relation to typical blocking agents, such as diethyl amine or dibutyl amine.

The polyurethane urea elastomers according to the invention may be produced by methods known per se. Synthesis by the NCO prepolymer process has proved particularly successful. In the first stage of this process, a relatively high molecular weight diol a) is reacted with diisocyanate c) in a solvent or in the melt, optionally in the presence of low molecular weight diols b), to form ar NCO prepolymer in such a way that the NCO prepolymer contains terminal NCO groups in a certain quantity.

Particularly suitable long-chain, relatively high molecular weight dihydroxy compounds a) (also known as macrodiols) are polyester diols and polyether diols. These diols generally have molecular weights of 1,000 to 8,000 and preferably 1,500 to 4,000.

Suitable polyester diols are, for example, dicarboxylic acid polyesters of aliphatic dicarboxylic acids which may contain both several diols and also several dicarboxylic acids or hydroxy carboxylic acids. Particularly suitable polyester diols are adipic acid mixed esters of adipic acid, hexane-1,6-diol and neopentyl glycol, adipic acid, butane-1,4-diol and neopentyl glycol or adipic acid, butane-1,4-diol, neopentyl glycol and hexane-1,6-diol.

Particularly suitable long-chain polyether diols are polytetramethylene oxide diols or copolyethers thereof with other ether-forming compounds, such as ethylene oxide or propylene oxide. Mixtures of the compounds mentioned may also be used.

Other relatively high molecular weight diol compounds (macrodiols), for example dihydroxylactone esters or dihydroxypolycarbonates, as known from the prior art, may also be used. The same applies to other relatively high molecular weight diols known from the prior art. Other suitable macrodiols are mentioned in unpublished patent application Le A 26 254, DE(P 3 932 949) which was filed at the same time as the present application.

Suitable low molecular weight diols b) are, for example, ethylene glycol, butane-1,2-diol, butane-1,4-diol, 1,4- and/or 1,3-cyclohexane dimethanol, N,N-bis-$\beta$-hydroxypropyl)-methylamine, N,N'-bis-($\beta$-hydroxyethyl)-piperazine, N,N-dimethyl-N',N'-hydroxyethyl hydrazine and other compounds of these classes.

The diisocyanates c) may be typical aromatic diisocyanates. They may optionally be used in combination with (relatively small quantities of) (cyclo)aliphatic diisocyanates, although (cyclo)aliphatic diisocyanates may even be used on their own. The claims of the present application exclude 1,4-cyclohexane diisocyanate in compositions of the type disclosed in a separate application (P 3 932 958) filed at the same time. Particularly useful results are obtained with the following diisocyanates: with 2,4-tolylene diisocyanate and corresponding isomer mixtures of 2,4-/2,6-diisocyanate, but especially with 4,4'-diphenyl methane diisocyanate and corresponding isomer mixtures containing small quantities of 2,4'- and/or 2,2'-isomers. It is of course possible to use mixtures of aromatic diisocyanates. In addition, the following (cyclo)aliphatic diisocyanates for example may be used either in admixture or on their own; 1,6-hexamethylene diisocyanate, 1,8-octamethylene diisocyanate, 2,3-methylhexamethylene-1,6-diisocyanate or 2,4-diisocyanato-1-methyl cyclohexane and also 4,4'-diisocyanato-1-methyl cyclohexane and also 4,4'-dicyclohexyl methane, 4,4'-dicyclohexyl alkylidene, 4,4'-dicyclohexyl ether diisocyanates in the form of their various stereoisomers or stereoisomer mixtures.

In the synthesis of the segmented elastomers by the NCO prepolymer process, the macrodiols are reacted with excess quantities of diisocyanates c) via the diols (a+b) either in the melt or in a solvent in such a way the reaction product contains terminal isocyanate groups. The OH:NCO ratios are preferably between 1:1.4 and 1:4.0 and more preferably between 1:1.6 and 1:3.8, so that NCO prepolymers having an NCO content of 1.4 to about 4.5% by weight and preferably 1.8 to 4.0% by weight NCO are formed. Depending on the molecular weight of the macrodiol, the OH:NCO ratio has to be selected within the limits indicated above so that the NCO content of the NCC prepolymer is within the stated range.

Suitable catalysts for production of the NCO prepolymer are Lewis acid catalysts, such as tin salts, or for example organotin compounds, such as organotin carboxylates or halides, dibutyl tin dilaurate; inorganic salts of inorganic acids, for example tin octoate, tin stearate, tin acetate, lead octoate; insertion catalysts, such as organotin alcoholates, $\beta$-dicarbonyl compounds, oxides, mercaptides, sulfides; tin compounds and phosphine tin compounds. Other suitable catalysts are Lewis base catalysts, such as tertiary amines, phosphines, pyridines, as known in principle in the prior art for the production of polyurethanes. Dibutyl tin dilaurate (Desmorapid® Z, a product of Bayer AG) or diazabicyclooctane (DABCO®) is preferably used. In general, the NCO prepolymer is produced without a catalyst.

Where solvents are used in the prepolymerization reaction, chlorobenzene, N-methyl pyrrolidone, dimethyl sulfoxide are particularly suitable, although the highly polar amide solvents generally used as spinning solvents, namely dimethyl formamide and dimethyl acetamide, are especially suitable.

For the synthesis of the segmented polyurethane ureas, the desired urea groups are introduced into the macromolecules by a chain-extending reaction of the NCO prepolymers with diamines. The NCO prepolymers (also known as macrodiisocyanates) synthesized in the NCO prepolymer stage are reacted with chain-extending agents f), preferably aliphatic diamines, and chain terminators/blocking agents g) according to the invention in highly polar solvents. Solubility and crystallizability and also the melting range of the hard segments are advantageously optimized through the choice of the chain-extending agent.

Preferred diamines f) are linear or branched diamines, for example 1,2-propylenediamine, 1,4-diaminobutane, 1,6-diaminohexane, 1,3-diaminocyclohexane or even 1,3-diamino-2,2-dimethyl propane. However, ethylenediamine is preferably used solely or predominantly as chain-extending agent.

Cycloaliphatic diamines, for example 1,3-diaminocyclohexane, may be used as co-chain-extending agents in quantities <50 of mol-%.

Secondary amines, such as piperazine, N-methyl ethylenediamine or N,N'-dimethyl ethylenediamine, may also be used as co-diamines, although this is less preferred.

The chain-extending reaction is preferably carried out in solution using highly polar solvents, such as dimethyl sulfoxide, N-methyl pyrrolidone, tut preferably dimethyl formamide or, more particularly, dimethyl acetamide.

The viscosity of the elastomer solution required for the preferred dry-spinning process is generally in the range from 30 to 350 Pa.s at 20° C. for a concentration of the spinning solution of 18 to 34% by weight. The elastomer solutions produced by the described process according to the invention may have solids concentrations of up to 40% and more, in which case the viscosity cf the elastomer solution is in the range from 100 to 250 Pa.s at 50° C.

In the dry-spinning process, the spinning solutions—optionally heated to approx. 120° C.—with viscosities of at least 30 Pa.s at 20° C. are spun through jets into a spinning duct approximately 4 to 8 meters long and heated to 150° to 250° C., into which air or inert gases, such as nitrogen, or steam heated to approximately 150° to 350° C. are blown.

The solutions produced in accordance with the invention remain stable for at least 5 days and preferably for at least 7 days before turning to paste and are distinctly more favorable than polymers in solution which are free from terminators or which contain similar quantities of hitherto typical terminators, for example diethyl amine.

The desired molecular weight may readily be adjusted by using a small quantity of monofunctional chain terminators according to the invention during the chain-extending reaction.

It has surprisingly been found that, in contrast to the monoamines used in the prior art (for example diethyl amine or dibutyl amine), cyclic monoamines corresponding to formulae A1) to A4) (see statement of invention and claims) give elastomer solutions having drastically improved solubility (reduced tendency to turn to paste) and that such spinning solutions remain effectively spinnable for long periods. Among the preferred chain terminators/blocking agents mentioned are, in particular, monoamines, such as dicyclohexyl amine, N-methyl cyclohexyl amine, 1-amino-2-methyl cyclohexane, 1-amino-3,5-dimethyl cyclohexane, 1-amino-3,3,5-trimethyl cyclohexane, 1-amino-3-methyl cyclohexane, 1-amino-3-ethyl cyclohexane, 1-amino-3-isopropyl cyclohexane, 1-amino-4-methyl cyclohexane (less preferred 3,3,5-trimethyl-1-azacycloheptane (TMD imine) or α-amino-caprolactam.

The compounds as claimed under (A6) result in an incorporation of tertiary amino groups of aliphatic character into the elastane molecule, thus yielding an improved dyeability.

Suitable monoisocyanate chain terminators B) are, for example, 1-isocyanato-2-methyl cyclohexane, 1-isocyanto-3,5-dimethyl cyclohexane, 1-isocyanato-3,3,5-trimethyl cyclohexane, 1-isocyanato-3-methyl cyclohexane or 1-isocyanato-3-isopropyl cyclohexane.

Mononuclear, heterocyclic monoamine compounds, such as

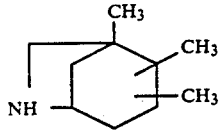

may also be used as the cyclic compounds. The monoamine chain terminators may advantageously be used in admixture with the diamine chain-extending agent, although they may be also be used beforehand (with the NCO prepolymers).

The described variants may also be combined.

Typical additives a) performing various functions may also be added in effective quantities to the elastomer solutions produced in accordance with the invention. Such additives includes, for example, antioxidants, light stabilizers, UV absorbers, brightening dyes, pigments, dye additives (for example oligomers or polymers containing tertiary amines), antistatic agents, abhesive additives, such as magnesium, calcium, lithium, zinc and aluminium salts of long-chain carboxylic acids, such as stearates, palmitates, or dimer fatty acids or mixtures of these salts or even additions of finely divided zinc oxides which may contain up to 15% by weight other oxides, for example magnesium oxide or calcium oxide or carbonates, for example calcium or magnesium carbonates. Zinc oxides in combination with alkaline earth oxides or carbonates as additives provide ether and also polyester elastomer filaments with excellent resistance to chlorine in the form of chlorinated water (detergents/swimming pools/bleaches) without high purity requirements, for example in the zinc oxide or trace sulfur content, having to be satisfied.

The elastomer solutions obtained by the process according to the invention may be spun to elastomer filaments by the described processes, although they may also be processed to film coatings or similar coatings by drying on the substrate or by coagulation.

The elastomer solutions according to the invention shown an unusual combination of excellent solubility and viscosity stability, even at high temperatures and over long storage times, and excellent light stability which is reflected in an improved natural color of the spinning solution and in improved stability of the filaments obtained therefrom both to light and to noxious gases.

Methods of measurement:

The measured quantities mentioned in the Examples were determined as follows:

The intrinsic viscosity of the elastomers was determined in a dilute solution of $< =0.5$ g/100 ml dimethyl acetamide at 30° C. by determination of the relative viscosity $\eta_R$ in relation to the pure solvent and conversion in accordance with the following equation:

$$\eta_R = \frac{t_1}{t_0}$$

$t_1$: throughflow time (sec.) of polymer solution
$t_0$: throughflow time (sec.) of pure solvent $$\eta_i = \frac{\ln \eta_R}{c}$$

Tenacity was determined in accordance with DIN 53 815 (cN/dtex). Maximum tensile elongation (in %) was also determined in accordance with DIN 53 815. The modulus at 100% and 300% initial elongation was determined at an elongation rate of $4 \times 10^{-3}$ meter per second in cN/dtex. The residual elongation was determined after 5x elongation to 300% and after a recovery times rf 60 seconds. The heat distortion temperature (HDT), hot break time (HBT) and fall in tension in hot water (FTHW) were determined by methods described in Chemiefasern/Textilindustrie, January 1978, No. 1/78, Vol. 28/80, pages 44 Relevant particulars can also be found in DE-OS 25 500 (1975).

Light stability was determined after an exposure time of 300 hours in the Xeno-Test 150 (DIN 54 004).

Resistance to exhaust gases was determined by the nitrogen oxide stability test according to DIN 54 025 (light treatment 1x, heavy treatment 3x).

EXAMPLE 1 (comparison with EXAMPLES 2a and b)

A mixture of 2,100 g of a polyester diol, molecular weight 3,404, based on adipic acid, hexane-1,6-diol, butane-1,4-diol and neopentyl glycol (molar ratio 48:33:9:10) and 900 g of a polyether diol based on polytetramethylene oxide (molecular weight 2,000, Terathane ® 2000, a product of DuPont, Wilmington, Del., USA) are mixed with 1,497 g anhydrous dimethyl acetamide and 492 g diphenyl methane-4,4'-diisocyanate (Desmodur ® 44, a product of Bayer AG) are added to the resulting mixture, followed by heating for 75 minutes to 50° C. until the NCO prepolymer has an NCO content of 2.21% by weight (based on prepolymer solids).

A mixture of 32.8 g ethylenediamine and 3.3 g diethyl amine (DEA) in 4,084 g dimethyl acetamide was prepared and 70 g CO₂ added thereto. 3,104 g of the NCO prepolymer solution were added to this carbamate suspension with intensive stirring over a period of 15 minutes. A clear, homogeneous elastomer solution having an elastomer solids content of 30% and a solution viscosity of 218.8 Pa.s/50° C. was obtained; intrinsic viscosity 1.19 dl/g (5 g elastomer solids per liter dimethyl acetamide at 30° C.). 0.3% by weight Mg stearate, 1% polyether siloxane (Silwet® L 7607, a polyether/-polydimethyl siloxane copolymer manufactured by Union Carbide), 1% Cyano 1790 (American Cyanaxide, USA), 0.5% Tinuvi® 622 (Ciba Geigy), 2% TiO₂ (Rutil KB-3, a product of Bayer AG), 7 ppm Makrolex®-Violett B (Bayer AG) and 4% of a dye additive prepared by reaction of N-methyl diisopropanolamine with 4,4'-dicyclohexyl methane diisocyanate in a ratio of 1:0.99 were added to the viscous elastomer solution (all additions based on PUH solids).

The solution was dry spun through a 12-bore spinneret having a bore diameter of 0.3 mm. Spinning duct temperature 220° C., air temperature 270° C., takeoff rate 400 m/minute using an air twisting element The textile data are shown in Table 1 while the long-term viscosity behavior is shown in Table 2.

EXAMPLE 2

A mixture of 2,100 g of a polyester diol as described in Example 1 and 900 g Terethane® 2000 were mixed with 1,497 g dimethyl acetamide and 492 g diphenyl methane-4,4'-diisocyanate were added to the resulting mixture, followed by heating for 75 minutes to 50° C. until the NCO prepolymer had an NCO content of 2.1% by weight. The prepolymer solution was divided up for two chain extensions.

EXAMPLE 2a

A mixture of 21.6 g ethylenediamine and 3.4 g N-methyl cyclohexyl amine (MCHA) in 2,725 g dimethyl acetamide was prepared and 50 g CO₂ added thereto. 2,074 g of the NCO prepolymer solution were added to the resulting carbamate suspension over a period of 15 minutes. A clear homogeneous elastomer solution having an elastomer solids content of 30% and a solution viscosity of 238 Pa.s (50° C.) was obtained; intrinsic viscosity 1.21 dl/g.

EXAMPLE 2b

A mixture of 21.6 g ethylenediamine and 5.4 g dicyclohexyl amine (DCHA) in 2,730 g dimethyl acetamide was prepared and 50 g CO₂ added thereto. 2,113 g of the NCO prepolymer solution were added to the resulting carbamate suspension. A clear homogeneous elastomer solution having a solids content of 30% and a solution viscosity of 127 Pa.s (50° C.) was obtained; intrinsic viscosity 1.21 dl/g. 0.3% by weight Mg stearate, 1% Silwet® L 7607, 1% Cyanox® 790, 0.5% Tinuvin® 622, 2% TiO₂, 7 ppm Makrolexz®-Violett B and 4% of the dye additive described in Example 1 were added to the viscous elastomer solutions of Examples 2a and 2b (all additions based on PUH solids).

Dry spinning was carried out under the same conditions as in Example 1. The textile data are shown in Table 1 while the long-term viscosity behavior is shown in Table 2.

As can be seen from Table 1, the chain terminators MCHA and DCHA according to the invention do not adversely affect the textile data of the elastane filaments. By contrast, it is clear from Table 2 that the chain terminators MCHA and DCHA according to the invention give much more stable elastomer solutions over a period of at least 5 days than DEA (diethyl amine according to the prior art).

EXAMPLE 3 (comparison with EXAMPLES 4a and b)

A mixture of 910 g of the polyester diol (molecular weight 3,313) described in Example 1 and 390 g Terethane® 2000 was mixed with 650 g dimethyl acetamide and 217 g diphenyl methane-4,4'-diisocyanate added to the resulting mixture, followed by heating for 60 minutes to 50° C. until the NCO prepolymer had an NCO content of 1.92%.

A mixture of 18.84 g ethylenediamine and 1.9 g diethyl amine (DEA) in 2,582 g dimethyl acetamide was prepared and 40 g CO₂ added thereto. 1,919 g of the NCO prepolymer solution were added to the resulting carbamate suspension. A clear homogeneous elastomer solution having an elastomer solids content of 30% and a solution viscosity of 119 Pa.s (50° C.) was obtained; intrinsic viscosity 1.11 dl/g. 0.3% Mg stearate, 1% Silwet® L 7607, 1% Cyanox® 1790 and 4% of the dye additive described in Example 1 were added to the viscous elastomer solution (all additions based on PUH solids). Dry spinning was carried out as described in Example 1. The textile data are shown in Table 1 while the long-term viscosity behavior at 25° C. and 5° C. is shown in Table 3.

EXAMPLE 4

A mixture of 1,820 g of the polyester diol (molecular weight 3,313) described in Example 1 and 780 g Terathane® 2000 was mixed with 1,300 g dimethyl acetamide and 433 g diphenyl methane-4,4'-diisocyanate was added to the resulting mixture, followed by heating for 60 minutes to 50° C. until the NCO prepolymer had an NCO content of 1.97%.

The resulting prepolymer solution was divided up for two chain extensions.

EXAMPLE 4a

A mixture of 19.3 g ethylenediamine and 3.8 g

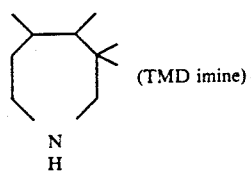
(TMD imine)

in 2,587 g dimethyl acetamide was prepared and 45 g CO₂ added thereto. 1,917 of the NCO prepolymer solution were added to the resulting carbamate suspension. A clear, homogeneous elastomer solution having an elastomer solids content of 30% and a solution viscosity of 110 Pa.s (50° C.) was obtained; intrinsic viscosity 1.08 dl/g.

EXAMPLE 4b

A mixture of 19.3 g ethylenediamine and 4.1 g

TABLE 1

Variation of the chain terminators - textile data -

| Example | Solids content of spinning solution | Chain terminator | Denier (dtex) | T (cN/dtex) | T actual (cN/dtex) | MTE (%) | ε (%) | R100 (cN/dtex) | R300 (cN/tex) | HDT (°C.) | HBT (secs.) | ηi |
|---|---|---|---|---|---|---|---|---|---|---|---|---|
| 1 (Comp.) | 30% | 4% DEA | 157 | 0.97 | 6.48 | 569 | 17 | 0.043 | 0.130 | 171 | 26 | 1.19 |
| 2a | 30% | 4% MCHA | 158 | 1.02 | 6.54 | 538 | 15 | 0.048 | 0.153 | 173 | 25 | 1.21 |
| 2b | 30% | 4% DCHA | 150 | 1.19 | 7.43 | 527 | 14 | 0.046 | 0.160 | 173 | 26 | 1.21 |
| 3 (Comp.) | 30% | 4% DEA | 160 | 1.03 | 6.69 | 550 | 14 | 0.045 | 0.138 | 167 | 20 | 1.11 |
| 4a | 30% | 4% TMD | 159 | 1.05 | 6.79 | 546 | 15 | 0.043 | 0.137 | 165 | 18 | 1.08 |
| 4b | 30% | 4% IPD | 157 | 1.05 | 6.69 | 538 | 14 | 0.047 | 0.150 | 165 | 19 | 1.14 |
| 5 (Comp.) | 34% | 3% DEA | 154 | 0.85 | 4.56 | 432 | 22 | 0.060 | 0.249 | 182 | 36 | 1.14 |
| 6 | 40% | 5% DCHA | 142 | 0.82 | 4.62 | 466 | 23 | 0.062 | 0.200 | 181 | 27 | 1.20 |

T: tenacity
T actual: tenacity based on initial denier
MTE: maximum tensile elongation (elongation at break)
ε: residual elongation after 5 × elongation to 300%
R100/R300: power at 100 and 300% elongation
HBT: hot break time; time at which the filament breaks under defined elongation at 200° C.
HDT: heat distortion temperature; temperature at which the filament breaks under defined load
ηi: η intrinsic

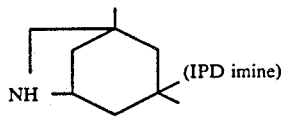 (IPD imine)

in 2,587 g dimethyl acetamide was prepared and 45 g $CO_2$ added thereto. 1,917 g of the NCO prepolymer solution were added to the resulting carbamate suspension. A clear, homogeneous elastomer solution having an elastomer solids content of 30% and a solution viscosity of 244 Pa.s (50° C.) was obtained; intrinsic viscosity 1.14 dl/g.

0.3% Mg stearate, 1% Silwet ® L 7607, 1% Cyanox ® 1790 and 4% of the dye additive described in Example 1 were added to the viscous elastomer solutions of Examples 4a and b (all additions based on PUH solids).

Dry spinning was carried out as described in Example 1. Table 1 shows the textile data while Table 3 shows the long-term viscosity behavior at 25° C. and 50° C.

As can be seen from Table 1, the chain terminators TMD imine and IPD imine according to the invention do not adversely affect the textile data of the elastane filaments. By contrast, Table 3 shows that the chain terminators according to the invention have enormous advantages over DEA in regard to solubility and long-term viscosity behavior at elevated temperature. Thus, the use of TMD imine leads to very high viscosity stability while the use of IPD imine actually leads to a slight desirable reduction in solution viscosity without any significant change in the intrinsic viscosity of the PUH solids.

TABLE 2

Stability of the elastomer solutions of Examples 1, 2a, b at 25° C.

| Example | Chain terminator (4%) | Solution viscosities [Pa.s (50° C.)] | | | | $\Delta_\eta$ |
|---|---|---|---|---|---|---|
| | | 1st | 2nd | 3rd | 5th day | |
| 1 | DEA | 186 | n.d. | 235 | 238 | +30% |
| 2a | MCHA | 238 | 258 | n.d. | 246 | +3.4% |
| 2b | DCHA | 127 | 133 | n.d. | 139 | +9.5% |

$\Delta_\eta$: overall change in solution viscosity percent in relation to the initial viscosity
n.d.: not determined

TABLE 3

Stability of the elastomer solutions of Example 3, 4a, b at 25° C. and 50° C.

| Example | Chain terminator (4%) | Storage temp. | Solution viscosity [Pa.sec. (50° C.)] | | | | | η |
|---|---|---|---|---|---|---|---|---|
| | | | 1st | 2nd | 3rd | 8th | 10th day | |
| 3 | DEA | 25° C. | 119.4 | 148.6 | 147.1 | 177.8 | 166.6 | +40% |
| | | 50° C. | 119.4 | — | 122.4 | 136.9 | 142.4 | +19% |
| 4a | TMD imine | 25° C. | 110 | 110.7 | 117.9 | 119.4 | 117.4 | +7% |
| | | 50° C. | 110 | — | — | 119.2 | 109.2 | 0% |
| 4b | IPD imine | 25° C. | 244 | 160 | — | 142.7 | 139.8 | −43% |
| | | 50° C. | 244 | — | — | 176.2 | 168.9 | −31% |

EXAMPLE 5 (comparison with EXAMPLE 6)

4,000 g of a polyester based on adipic acid, hexane diol and neopentyl glycol (molecular weight 2,022) were mixed with 1,229 g dimethyl acetamide and 915 g diphenyl methane-4,4'-diisocyanato were added to the resulting mixture, followed by heating for 40 minutes at 50° C. until the NCO content of the NCO prepolymer was 2.60%.

A mixture of 38.7 g ethylenediamine and 2.9 g diethyl amine (DEA) in 3,292 g dimethyl acetamide was prepared and 80 g $CO_2$ was added thereto. 2,522 g of the NCO prepolymer solution were added to the resulting carbamate suspension. A clear homogeneous elastomer solution having an elastomer solids content of 35% and a solution viscosity of 213 Pa.s (50° C.) was obtained; intrinsic viscosity 1.14 dl/g.

1% Cyanox ® 1790, 0.5% Tinuvin ® 622, 0.4% Mg stearate and 1% Silwet ® L 7607 were added to the viscous elastomer solution (all additions based on PUH solids).

The solution was dry spun as described in Example 1. The textile data are shown in Table 1.

However, the solution prepared in Example 5 turned to paste on only the third day at a storage temperature of 0° C. whereas, at 25° C., the solution viscosity on the fourth day was as high as 300 Pa.s (50° C.).

EXAMPLE 6

4,000 g of the polyester described in Example 5 were mixed with 1,229 g dimethyl acetamide and 915 g diphenyl methane-4,4'-diisocyanate were added to the resulting mixture, followed by heating for 40 minutes at 50° C. until the NCO content of the NCO prepolymer was 2.62%.

A mixture of 38.3 g ethylenediamine and 12.1 g dicyclohexyl amine in 2,576 g dimethyl acetamide was prepared and 80 g $CO_2$ added thereto. 2,500 g of the NCO prepolymer solution were added to the resulting carbamate suspension. A clear homogeneous elastomer solution having an elastomer solids content of 40% and a solution viscosity of 169 Pa.s (50° C.) was obtained; intrinsic viscosity 1.20 dl/g.

1% Cyano® 790, 0.5% Tinuvin® 622, 0.4% Mg stearate and 1% Silwet® L 7607 were added to the viscous elastomer solution (all additions based on PUH solids).

The solution was dry spun as described in Example 1.

The textile data are shown is Table 1. As can be seen, the elastane filaments obtained show good textile properties.

The elastomer solution described here remained stable for 5 days. An attempt was made to prepare a corresponding elastomer solution with diethyl amine. However, this was not possible. The elastomer solution turned to paste shortly after preparation and could not be spun.

EXAMPLE 7

A mixture of 350 g of the polyester diol described in Example 1 and 150 g Terethan® 2000 was mixed with 250 g dimethyl acetamide and 83.3 g diphenyl methane-4,4'-diisocyanate were added to the resulting mixture, followed by heating for 60 minutes at 50° C. until the NCO content of the NCO prepolymer was 2.05%.

The prepolymer solution was divided up for several chain extensions.

The preparation data for the chain extensions are shown in Table 4.

No spinning additives or light stabilizers were added to the elastomer solutions.

The viscosity behavior of the five elastomer solutions over 7 days at 25° C. is shown in Table 5. The outstanding advantage of the chain terminators according to the invention over diethyl amine and 2-methyl piperidine (2 MP) is clearly illustrated. In addition, the elastomer solutions containing the chain terminators according to the invention were clear and colorless after 7 days although no light stabilizers were present whereas the DEA and 2MP elastomer solutions had turned bright yellow and cloudy.

TABLE 4

Production of elastomer solutions having a solids content of 30% - Example 7

| Example | Chain terminator | EDA | DMAC | $CO_2$ | NCO prepolymer solution | Solution viscosity (at 50° C.) | $\eta i$ (dl/g) |
|---|---|---|---|---|---|---|---|
| 7a (Comp.) | DEA | 0.107 g | 1.06 g | 136 g | 4 g | 100 g | 137 Pa.s | 1.13 |
| 7b | 3-A-1MCH | 0.17 g | 1.06 g | 136 g | 4 g | 100 g | 106 Pa.s | 1.01 |
| 7c | 2-A-1MCH | 0.17 g | 1.06 g | 136 g | 4 g | 100 g | 86.5 Pa.s | 1.08 |
| 7d | 5-A-TMCH | 0.21 g | 1.06 g | 136 g | 4 g | 100 g | 79.2 Pa.s | 1.03 |
| 7e (Comp.) | 2-M-P | 0.15 g | 1.06 g | 136 g | 4 g | 100 g | 125 Pa.s | 1.21 |

EDA: ethyldiamine
DMAC: dimethyl acetamide
$CO_2$: quantity of $CO_2$
$\eta i$: $\eta$ intrinsic (as determined in 1% solution in DMA at 25° C.)
DEA: diethyl amine
3-A-1MCH: 1-amino-3-methyl cyclohexane
2-A-1MCH: 1-amino-2-methyl cyclohexane
5-A-TMCH: 1-amino-3,3,5-trimethyl cyclohexane
2-M-P: 2-methyl piperidine

TABLE 5

Example 7
Viscosity behavior (at 25° C.) of 30% elastomer solutions - Examples 7a–d Measured viscosity $\eta_{D6}$ at 50° C. in Pa.s

| Example | During production | After 7 days | $\Delta\eta$ | Chain terminator | Color of elastomer solution after 7 days |
|---|---|---|---|---|---|
| 7a | 137 | 162 | +18% | (Comparison test with ethyl amine) | Bright yellow |
| 7b | 106 | 106 | 0% | 1-Amino-3-methyl cyclohexane | Colorless |
| 7c | 86.5 | 94 | +8% | 1-Amino-2-methyl cyclohexane | Colorless |
| 7d | 79.2 | 86 | +7.5% | 1-Amino-3,3,5-trimethyl cyclohexane | Colorless |
| 7e | 125 | 212 | +70% | (Comparison test with 2-methyl piperidine) | Bright yellow |

$\Delta\eta$: Overall change in solution viscosity in percent in relation to the initial viscosity

TABLE 6

Example 8
Preparation of NCO prepolymer for production of the elastomer solutions in Table 7

| Polyester diol (as described in Example 1) | Terathane ® 2000 | DMAC | Diphenyl methane-4,4-diisocyanate | Reaction time at 50° C. | NCO content (based on prepolymer solids) | For Example |
|---|---|---|---|---|---|---|
| 2356 g | 1010 g | 1682 g | 561 g | 60 mins. | 2.03% | 8a |
| 2356 g | 1010 g | 1682 g | 561 g | 60 mins. | 2.07% | 8b, c |
| 2356 g | 1010 g | 1682 g | 561 g | 60 mins. | 2.10% | 8d, e |
| 2356 g | 1010 g | 1682 g | 561 g | 60 mins. | 2.11% | 8f |

The corresponding chain extensions of these prepolymer solutions are shown in Table 7.

TABLE 7

Example 8 (chain extension)
Production of elastomer solutions having a solids content of 35%

| Example | Chain terminator | | [Eq. %] | EDA | DMAc | $CO_2$ | NCO Prepolymer solution | Solution visc. (at 50° C.) 1st day | ηi (dl/g) | Solution visc. (at 50° C.) | Δη |
|---|---|---|---|---|---|---|---|---|---|---|---|
| 8a (Comp.) | DEA | 4.45 g | 7% | 24.3 g | 2454 g | 60 g | 2400 g | 431 Pa.s (turns to paste shortly after prep.) | 1.28 | Paste | ∞ |
| 8b | TMD imine | 5.0 g | 4% | 25.6 g | 2457 g | 60 g | 2400 g | 291 Pa.s | 1.05 | 374 Pa.s | +29% |
| 8c | 2-A-1MCH | 4.02 g | 4% | 25.6 g | 2455 g | 60 g | 2420 g | 200 Pa.s | 1.02 | 235 Pa.s | +18% |
| 8d | 5-A-TMCH | 5.1 g | 4% | 26 g | 2457 g | 60 g | 2420 g | 196 Pa.s | 0.98 | 244 Pa.s | +25% |
| 8e | 3-A-1MCH | 5.1 g | 5% | 25.7 g | 2457 g | 60 g | 2410 g | 160 Pa.s | 0.96 | 209 Pa.s | +31% |
| 8f | TMD imine | 7.7 g | 6% | 25.6 g | 2461 g | 60 g | 2420 g | 150 Pa.s | 0.94 | 170 Pa.s | +13% |

[Eq. %]: equivalent percent of chain terminator, based on NCO equivalents present in the NCO prepolymer
Δη: overall change in solution viscosity percent in relation to the initial viscosity

AD EXAMPLE 8

1% Cyano ® 1790, 0.4% Mg stearate, 1% Silwet ® L 7607 and 4% of the dye additive described in Example 1 were added to the corresponding elastomer solutions (all additions based on PUH solids).

The elastomer solutions containing the chain terminators according to the invention could readily be dry spun as in Example 1 into elastane filaments having good textile properties. The elastomer solution containing diethyl amine (Comparison Example 8a) could not be spun because it had turned to paste. By contrast, the solutions according to the invention remained free-flowing and stable over an observation period of 12 days.

TABLE 8

Example 9 (Comparison)
Preparation of NCO prepolymer for production of the elastomer solutions in Table 9

| Polyester diol (as described in Example 1) | Terathane ® 2000 | DMAc | Diphenyl methane-4,4'-diisocyanate | Reaction time at 50° C. | NCO content (based on prepolymer solids) | For Example |
|---|---|---|---|---|---|---|
| 280 g | 120 g | 200 g | 66.6 g | 60 mins. | 1.87% | 9 |

TABLE 9

Example 9 (chain extension)
Preparation of an elastomer solution having a solids content of 35%

| Example | Chain terminator | [Eq. %] | EDA | DMAc | $CO_2$ | NCO prepolymer solution | Solution visc. (at 50° C.) | ηi (dl/g) |
|---|---|---|---|---|---|---|---|---|
| 9a (Comp.) | A-CH 0.4 g | 6% | 1.88 g | 204.3 g | 4 g | 200 g | 118 Pa.s | 0.9 |

A—CH: aminocyclohexane

TABLE 10

Example 9 (comparison with Example 8)
Stability behavior of the elastomer solutions at 25° C. and 50° C.

| | Chain terminator | | Solution viscosity Pa.sec. (50° C.)] | | | |
|---|---|---|---|---|---|---|
| Example | (6%) | Storage temp. | 1st | 3rd | 7th day | Δη |
| 9 | A—CH | 25° C. | 118 | 154 | Paste | ∞ |
| | | 50° C. | 118 | 172 | 288 | +85% |

It can be seen from Table 10 that, unlike the chain terminators used in accordance with the invention, the chain terminator aminocyclohexane does not stabilize solution viscosity, i.e. the elastomer solutions show a distinct increase in viscosity after 7 days. Accordingly, the chain terminator mentioned in Example 9 is unsuitable for the desired use in highly concentrated elastomer solutions.

TABLE 11

Example 10
Preparation of NCO prepolymer for production of the elastomer solution in Table 11

| Polyester diol (as described in Example 1) | Terathane ® 2000 | DMAc | Diphenyl methane-4,4'-diisocyanate | Reaction time at 50° C. | NCO content (based on prepolymer solids) | For Example |
|---|---|---|---|---|---|---|
| 313.5 g | 134.4 g | 224.0 g | 74.6 g | 60 mins. | 189% | 10 |

TABLE 12

Example 10 (chain extension)
Preparation of an elastomer solution having a solids content of 35%

| Example | Chain terminator | [Eq. %] | EDA | DMAc | $CO_2$ | NCO prepolymer solution | Solution visc. (at 50° C.) | $\eta i$ (dl/g) |
|---|---|---|---|---|---|---|---|---|
| 10 | α-ACP 0.38 g | 5% | 1.75 g | 250.4 g | 4 g | 250 g | 189 Pa.s | 0.98 |

α-ACP: α-aminocaprolactam

TABLE 13

Solution viscosity tests

| Example | Chain terminator | Storage temperature | Solution visc. 1st day | [Pa.sec. (50° C.)] 5th day | $\Delta\eta$ |
|---|---|---|---|---|---|
| 10 | α-ACP | 25° C. | 189 | 175 | −7% |
|  |  | 50° C. | 189 | 193 | +2% |

α-ACP: α-aminocaprolactam

Evaluation of light stability by the Xeno Test 150 and stability to noxious gases by the $NO_x$ Test Stockings were produced from the elastane filaments of Example 8c–f (with the chain terminators according to the invention) and of Example 3 (with diethyl amine for comparison). These stockings were treated with three formulations:

1. Original
   2 Hours in petroleum ether at room temperature solution 1:30
2. Peroxide bleaching
   MgSO₄.7H₂O — 0.2 g/l
   Levapon AN liquid — 0.5 ml/l
   Waterglass — 2 ml/l
   H₂O₂ 35% — 6 ml/l
   Blankophor BA liquid — 0.7%
   Blankophor DCB ultraf. — 0.2%
   80 mins. at 90 to 95° C.
   solution 1:30
3. Acidic lightening
   Blankit IN — 2 g/l
   Calgon T — 2 g/l
   Diadavin EWN 200% — 0.5 g/l
   Blankophor Cl liquid — 0.5 g/l
   40 mins. at 80 to 85° C., pH 4 (acetic acid)
   solution 1:30

Blankophor ® is a product of Bayer AG
Diadavin ® is a product of Bayer AG
Levapon ® is a product of Bayer AG
Blankit ® is a product of Bayer AG
CalgonT ® is a product of Benckiser To test their stability to light, the elastane stockings thus treated were subjected to the Xenon Test 150 for 300 h and to a nitrogen oxide stability text (DIN 54 025).

The Xenon Test shows that the chain terminators according to the invention produce a distinct improvement in light stability compared with diethyl amine, the chain terminators TMD imine and 1-amino-3-methyl cyclohexane producing the highest light stability in the elastane.

The nitrogen oxide stability test shows that, compared with diethyl amine, better stability to exhaust gases is obtained in particular with the chain terminator 1-amino-2-methyl cyclohexane after peroxide bleaching and with the chain terminators TMD imine, 1-amino-3-methyl cyclohexane and 1-amino-3,3,5-trimethyl cyclohexane after acidic lightening.

We claim:
1. A process for the production of solutions of segmented polyurethane ureas by reaction of NCO prepolymers based on relatively high molecular weight dihydroxy compounds and excess quantities of diisocyanates with chain-extending agents terminated by NH-functional groups in the presence of monofunctional primary and/or secondary amines as chain terminators, characterized in that A1 to A4

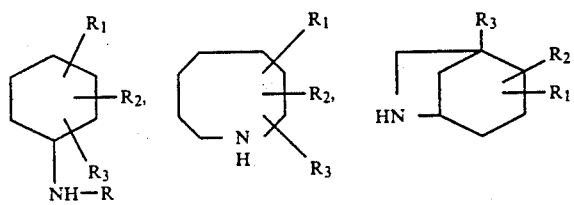

(A1)    (A2)    (A3)

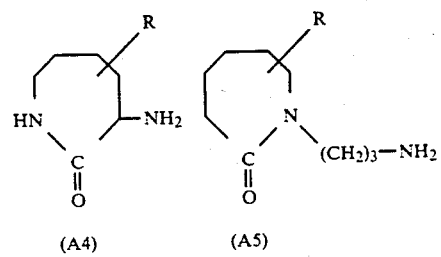

(A4)    (A5)

-continued

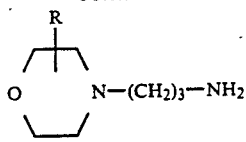

(A6)

in which R=H, a linear or branched $C_{1-4}$ alkyl radical or a cycloalkyl radical (preferably H, $CH_3$, cyclohexyl) $R_1$, $R_2$, $R_3$=H or a linear or branched $C_{1-4}$ alkyl radical, although at least one substituent is alkyl unless R is already alkyl or cycloalkyl, are used as chain terminators in quantities of 0.01 to 10 equivalent-%, based on equivalents present in the NCO pre-polymer, and preferably in a quantity of 0.5 to 7 equivalent-%.

2. A process as claimed in claim 1, characterized in that, in a first stage, a prepolymer
   a) a relatively high molecular weight dihydroxy compound having molecular weights of 1,000 to 8,000 is reacted
   b) optionally with addition of low molecular weight dihydroxy compounds having molecular weights of 62 to 399 in quantities of up to at most 15 mol-%, based on a) and
   c) excess molar quantities of aromatic and/or (cycl-)aliphatic diisocyanates (except 1,4-cyclohexane diisocyanate),
   d) optionally in the presence of catalysts, more particularly tin catalysts,
   e) in the melt or in solvents, preferably highly polar amide solvents, such as dimethyl formamide or, more particularly, dimethyl acetamide, to form an NCO prepolymer having an NCO content (based on solids) of 1.4 to 4.5% and in a second step, the NCO prepolymer thus formed is chainextended with
   f) solutions of (cyclo)aliphatic diamines, more particularly alkylenediamines, in highly polar solvents containing amide groups, the chain-extending reaction being carried out in the presence of
   g) special monofunctional chain terminators/blocking agents based on monoamines corresponding to general formulae A1) to A4),

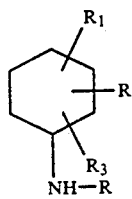
(A1)

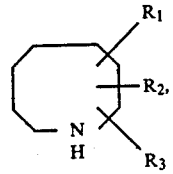
(A2)

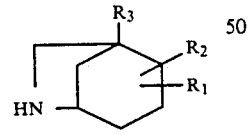
(A3)

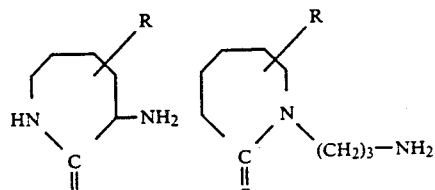
(A4)  (A5)

in which R=H, a linear or branched $C_{1-4}$ alkyl radical or a cycloalkyl radical (preferably H, $CH_3$, cyclohexyl) $R_1$, $R_2$, $R_3$=H or a linear or branched $C_{1-4}$ alkyl radical, although at least one substituent is alkyl unless R is already alkyl or cycloalkyl, are used as chain terminators in quantities of 0.01 to 10 equivalent-%, based on NCO equivalents present in the NCO prepolymer, and reacted to form elastomer solutions having a solids concentration of at least 15% by weight and preferably 20 to 40% by weight.

3. A process as claimed in claim 1, characterized in that monoamines corresponding to formulae A1), A2), A3) and/or A4) are used in admixture with the chain-extending agents f) as chain terminators g).

4. A process as claimed in claim 1, characterized in that 1-aza-3,3,5-trimethyl cycloheptane, 1-amino-3,3,5-trimethyl cyclohexane, 1-amino-3-methyl cyclohexane, 1-amino-2-methyl cyclohexane, α-aminocaprolactam or

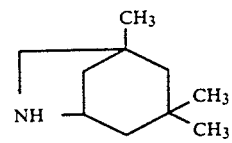

or 1-isocyanato-3,3,5-trimethyl cyclohexane, 1-isocyanato-3-methyl cyclohexane or 1-amino-2-methyl cyclohexylamine is used as the chain-extending agent/blocking agent.

5. Films, filaments or coatings of segmented polyurethane ureas obtained by the process claimed in claim 1 containing terminal groups corresponding to the formulae

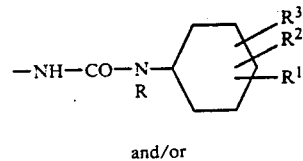

and/or

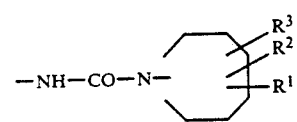

and/or

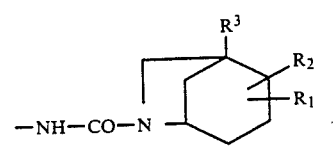

and/or

-continued
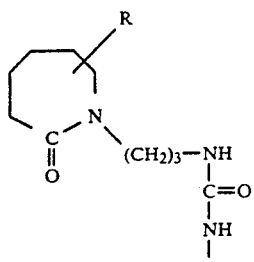
and/or
-continued
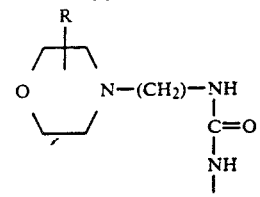
and/or
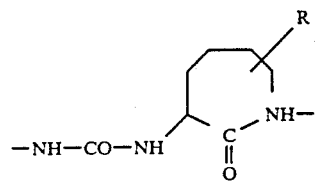
in which R=hydrogen, a $C_{1-4}$alkyl group or a cyclohexyl group, $R_1$, $R_2$ and $R_3$=hydrogen or a linear or branched $C_{1-4}$alkyl group, but contain at least one alkyl group where R is hydrogen.
* * * * *